A. E. JENNEY.
ADAPTABLE MOTOR AND MOUNTING.
APPLICATION FILED FEB. 14, 1917.
1,246,930.
Patented Nov. 20, 1917.
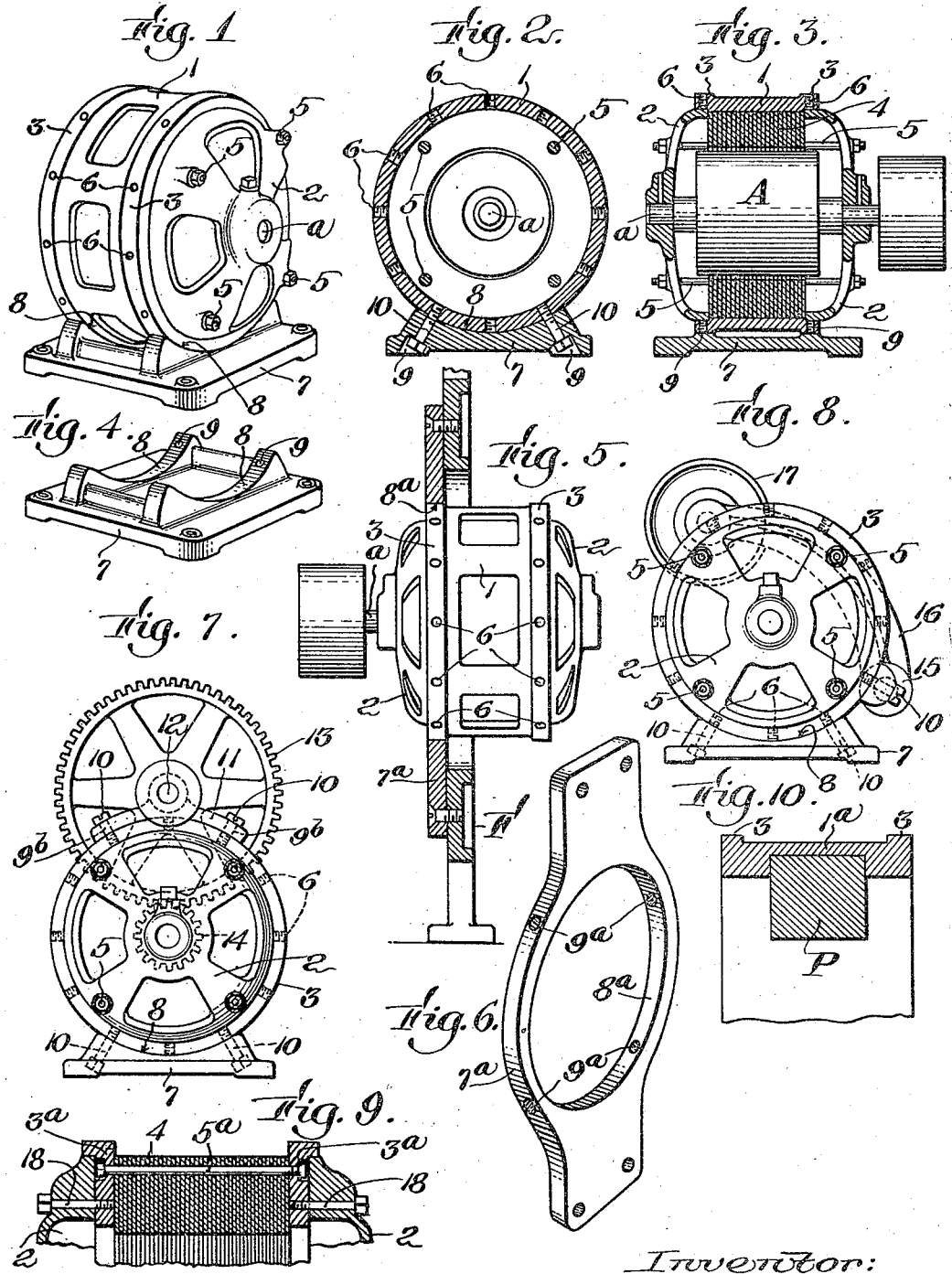

UNITED STATES PATENT OFFICE.

ARTHUR E. JENNEY, OF MIDDLEBORO, MASSACHUSETTS.

ADAPTABLE MOTOR AND MOUNTING.

1,246,930.

Specification of Letters Patent. Patented Nov. 20, 1917.

Application filed February 14, 1917. Serial No. 148,598.

*To all whom it may concern:*

Be it known that I, ARTHUR E. JENNEY, a citizen of the United States, and resident of Middleboro, in the county of Plymouth and State of Massachusetts, have invented new and useful Improvements in Adaptable Motors and Mountings, of which the following is a specification.

This invention relates to mountings for electric motors, and its principal object is to provide means whereby a motor may be readily adapted and applied to a great variety of situations, such as ceilings, walls, machine frames, etc., without necessitating special designing or special construction of the motor casing and support to adapt the motor to every change of environment. A further object of the invention is to provide an adjustable support or bracket, adaptable to various positions on the motor, for supporting other working parts, enabling such parts to be applied to the motor in the desired position irrespective of the position in which the motor itself is mounted. These and other features of the invention will hereinafter be more fully described and particularly pointed out in the claims.

In the accompanying drawings which illustrate several embodiments of the invention,—

Figure 1 is a perspective view of a motor and its support, exemplifying the invention in one form;

Fig. 2 is a vertical cross section of the parts shown in Fig. 1;

Fig. 3 is a vertical longitudinal section of the parts shown in Fig. 1;

Fig. 4 is a perspective view of the motor support of the kind shown in Figs. 1 to 3;

Fig. 5 is a vertical section, partly in elevation, of a modification of the invention.

Fig. 6 is a perspective view of the motor support shown in Fig. 5;

Fig. 7 is an end elevation of a motor and its support of the kind shown in Figs. 1–4 with a second support or bracket carrying other working parts;

Fig. 8 is a view similar to Fig. 7 showing another form of support or bracket for additional working parts;

Fig. 9 is a detail in section showing a modification of the motor structure and bearing rings fixed to the motor; and Fig. 10 is another detail in section showing another modification of the motor structure and bearing rings.

Motors heretofore used as isolated power units for direct connection to machines and similar uses have ordinarily been made with a platform or support at the bottom constituting an integral part of the motor casing, which necessitates the mounting of the motor on a shelf or the like in a horizontal position. If the motor is to be supported on the ceiling or walls of a room, or on the upright frame of a machine, or in some situation where it is not possible to mount it on a level support, it has been necessary to contrive a special design or construction of the motor case to adapt it to its peculiar environment. With my invention the motor and motor casing may be made in a uniform or standard form and mounted in the desired position by means of an independent support to which the motor may be secured in an upright working position while the support may assume a great variety of positions.

In the form shown in Figs. 1 to 4, 1 represents the casing of an alternating current motor, and 2, 2 represent the heads. The casing 1 is provided at its ends with a pair of spaced integral bearing rings 3, the peripheries of which are circular and concentric with the motor shaft $a$. The casing 1, heads 2, and laminated armature 4, constituting the stator of the motor, are fastened together by bolts or rods 5. A is the rotor.

In the periphery of each of the bearing rings 3 is a series of radially disposed screw bores 6, uniformly spaced and sufficient in number to admit of the desired number of positions of adjustment of the support, twelve such holes being shown in the drawings.

7 is a base or support for the motor having a pair of curved supporting surfaces 8, herein shown as formed in the arc of a circle adapted to engage and fit the circular bearing surfaces of the rings 3. The support 7 is provided with holes 9 passing through the supporting surfaces 8 and adapted to register with screw bores 6 in the various relative positions of the motor and support. Screws or bolts 10 extending through holes 9 and into bores 6 secure the motor and support together. It will be understood that the support 7 can be fastened to the motor at the top as well as at the bottom, or at several intermediate stages on either side between the top and the bottom, according to the position in which it is necessary or convenient to mount the support 7. Whatever the relative position of the motor and support, the motor may still be placed right side up.

In the modification illustrated in Figs. 5 and 6 the motor and its bearing rings are the same as before, but the motor support is in the form of a plate 7ª having a circular supporting surface 8ª adapted to fit one of the rings 3. Holes 9ª, spaced to register with screw bores 6, are provided to receive the screws for securing the motor and support to each other. The plate 7ª may be bolted or secured to an upright frame F of the machine which the motor is to drive.

In Fig. 7 the motor and supporting base 7 are as shown in Figs. 1-4, and in addition there is a second support or bracket 11 having curved surfaces engaging and fitting the peripheries of the circular bearing rings 1. It will be understood that the bracket or support 11 may have two similar curved members, of which only one appears in Fig. 7, to engage the two rings 3. The support 11 may carry any desired working part such as the gear 13 journaled on shaft 12 in the bracket 11, and driven by gear 14 on the motor shaft, thus providing a reverse or back gear drive. The support 11 is removable and may be applied to various positions on the peripheries of the rings 3 by screws 10, as already described with reference to the support 7.

In Fig. 8 another form of adjustable bracket or support for an additional working part is shown, consisting of a cross head or cross bar 15, secured to the rings 3 by screws 10, carrying a swinging arm 16 with a pulley 17 to act as a tension device for a belt driven by a pulley on the motor shaft.

Various other forms of supports for the motor and supports for other working parts are within the scope of the invention, those above described being used merely by way of illustration.

In Fig. 9 a modification is shown of the bearing rings adapted to the stator of an alternating current motor which has no casing 1. In this case the rings 3ª, which have circular peripheries for engagment with the supports as before, are made separately, and are clamped in place with the laminated armature 4 between them by the bolts 5ª. The heads 2 are secured to the ends of the motor by screws 18 which pass through the heads 2 and are threaded into the rings 3ª.

In a direct current motor, in which the frame is the field, the bearing rings 3 are made integral with the motor ring 1ª (Fig. 10) which carries the pole pieces P.

I claim:

1. A motor having a bearing element fixed thereto, an independent support, said bearing element and support having mutually fitting engaging surfaces adapted for various relative positions of the motor and support, and means to secure the bearing element and support together in their several relative positions.

2. A motor having a bearing element fixed thereto, formed with a circular peripheral bearing surface concentric with the motor shaft, an independent support having a curved supporting surface adapted to engage and fit said circular bearing surface of the bearing element in various relative positions of the motor and support, and means to secure the bearing element and support together in their several relative positions.

3. A motor having a bearing element fixed thereto, an independent support, said bearing element and support having mutually fitting engaging surfaces adapted for various relative positions of the motor and support, the bearing element having radially disposed screw bores and the support having holes adapted to register with the screw bores in the several relative positions of the motor and support, and screws engaging the registering holes and bores to secure the bearing element and support together in their several relative positions.

4. A motor having a bearing element fixed thereto formed with a circular peripheral bearing surface concentric with the motor shaft, an independent support having a curved supporting surface adapted to engage and fit said circular bearing surface of the bearing element in various relative positions of the motor support, the bearing element having radially disposed screw bores and the support having holes adapted to register with the screw bores in the several relative positions of the motor and support, and screws engaging the registering holes and bores to secure the bearing element and support together in their several relative positions.

5. A motor having thereon a pair of fixed spaced bearing rings, the peripheries of said bearing rings being circular and concentric with the motor shaft, an independent support having a curved supporting surface adapted to engage and fit the peripheries of said bearing rings in various relative positions of the motor and support, and means to secure the motor and support together in their various relative positions.

6. A motor having thereon a pair of fixed spaced bearing rings, the peripheries of said bearing rings being circular and concentric with the motor shaft, an independent support having a pair of supporting surfaces in the form of arcs of circles adapted to engage and fit the peripheries of said circular bearings rings in various relative positions of the motor and support, and means to secure the motor and support together in their various relative positions.

7. A motor having a pair of spaced bearing rings formed integrally with the motor casing and having circular bearing peripheries concentric with the motor shaft, an independent support having supporting surfaces adapted to engage and fit said circular bearing surfaces in various relative positions of the motor and support, and means to secure the motor to the support in their several relative positions.

8. A motor having thereon a pair of fixed spaced bearing rings, the peripheries of said bearing rings being circular and concentric with the motor shaft, a detachable bracket adapted to carry other working parts having surfaces adapted to engage and fit the peripheries of said bearing rings in various positions thereon, and means to secure said bracket to said rings.

9. A motor having thereon a pair of fixed spaced bearing rings, the peripheries of said bearing rings being circular and concentric with the motor shaft, a base to support the motor having surfaces adapted to engage and fit the peripheries of said bearing rings in various positions thereon, means to secure the motor and base together in their various relative positions, a detachable bracket adapted to carry other working parts having surfaces adapted to engage and fit the peripheries of said bearing rings in various positions thereon, and means to secure said bracket to said rings.

Signed by me at Boston, Massachusetts, this 8th day of February, 1917.

ARTHUR E. JENNEY.

Copies of this patent may be obtained for five cents each, by addressing the "Commissioner of Patents, Washington, D. C."